(12) United States Patent
Stolte et al.

(10) Patent No.: US 7,938,082 B2
(45) Date of Patent: May 10, 2011

(54) DEVICE AND METHOD FOR AUTOMATICALLY STARTING A MILKING PROCESS

(75) Inventors: Friedrich Stolte, Halle (DE); Otto Krone, Laggenbeck (DE); Olaf Suhr, Oelde (DE)

(73) Assignee: GEA Farm Technologies GmbH, Bonen (DE)

( * ) Notice: Subject to any disclaimer, the term of this patent is extended or adjusted under 35 U.S.C. 154(b) by 1096 days.

(21) Appl. No.: 10/576,645

(22) PCT Filed: Nov. 4, 2004

(86) PCT No.: PCT/EP2004/012492
§ 371 (c)(1),
(2), (4) Date: Mar. 9, 2007

(87) PCT Pub. No.: WO2005/043985
PCT Pub. Date: May 19, 2005

(65) Prior Publication Data
US 2007/0261640 A1  Nov. 15, 2007

(30) Foreign Application Priority Data

Nov. 4, 2003  (DE) .................. 103 52 155

(51) Int. Cl.
*A01J 5/00* (2006.01)
(52) U.S. Cl. .................. 119/14.14; 119/14.13
(58) Field of Classification Search ........... 119/14.01, 119/14.02, 14.08, 14.14, 14.18, 14.13
See application file for complete search history.

(56) References Cited

U.S. PATENT DOCUMENTS

| 3,861,355 | A | | 1/1975 | Johnson et al. |
| 3,929,103 | A | * | 12/1975 | Schluckbier ............... 119/14.08 |
| 4,523,545 | A | * | 6/1985 | Kummer .................... 119/14.08 |
| 4,741,287 | A | * | 5/1988 | Kummer .................... 119/14.08 |
| 6,860,227 | B2 | | 3/2005 | Bücker |
| 6,978,733 | B2 | * | 12/2005 | Petterson et al. ............ 119/14.1 |

FOREIGN PATENT DOCUMENTS

| DE | 25 54 998 A1 | 6/1976 |
| DE | 30 44 445 A1 | 9/1981 |
| DE | 25 54 998 C2 | 11/1982 |
| DE | 87 07 855 U1 | 10/1987 |
| DE | 44 38 236 C1 | 11/1995 |
| DE | 100 30 408 A1 | 2/2002 |
| GB | 1 481 674 | 8/1977 |

OTHER PUBLICATIONS

English language Abstract, Translated Description and Claims of DE 33 42 972 A1, European Patent Office's esp@cenet.com database, 3pp.
English language Abstract, Translated Description and Claims of DE 44 38 236 C1, European Patent Office's esp@cenet.com database, 3pp.
English language Translated Description and Claims of DE 87 07 855 U1, European Patent Office's esp@cenet.com database, 2pp.

* cited by examiner

*Primary Examiner* — Trinh T. Nguyen
(74) *Attorney, Agent, or Firm* — Smith Law Office

(57) ABSTRACT

A milking machine cylinder comprising a flexible element and at least one sensor element which detects at least a substantial weight relief of the flexible element in order to trigger a start signal for a milking process.

30 Claims, 2 Drawing Sheets

DEVICE AND METHOD FOR AUTOMATICALLY STARTING A MILKING PROCESS

FIELD AND BACKGROUND OF THE INVENTION

The invention relates to a device and a method wherein gripping the milking unit triggers a start signal for a milking process.

The prior art discloses in DE 25 54 998 C2 a device and a method wherein the starting process occurs automatically. The removal cylinder in this known system is in a substantially vertical position and pivotally fixed at its upper end. As the milking unit is gripped, said milking unit is displaced toward the animal such that the pivotable removal cylinder is displaced from its vertical position. Said displacing the removal cylinder will enable a switch that generates the start signal for the milking process. The rope is released. When the cylinder has been applied it will—due to gravitation—return to its vertical position in which it remains until the end of milking. After the removal signal the cylinder is biased, thus again assuming a slanted position. The milking unit is removed and the cylinder with the milking unit hanging from it will oscillate until it evens out. Such oscillating motion of the cylinder and the milking unit occurs within the operating range of the milker who may be considerably irritated.

It is a disadvantage in the known prior art that the removal cylinder must be considerably pivoted for starting. In addition the removal cylinder swings out after the end of the milking process which may inhibit the work of the milker.

Therefore it is the object of the present invention to provide a device and a method for simplifying the starting process.

One aspect is that triggering the starting process is simplified. Another aspect is that after the start signal, the milking unit can be displaced from the milker to the animal faster and requiring less force. Yet another aspect is that swinging-out of the removal cylinder is eliminated.

SUMMARY OF THE INVENTION

The device of the invention comprises a milking machine cylinder which may be configured for example as a milking unit removal cylinder or a removal cylinder. A flexible element is provided to hook up the milking unit wherein said flexible element may be configured as a rope, a chain or the like. At least one sensor element is provided which detects at least a substantial weight relief of the flexible element in order to trigger a start signal for a milking process.

The invention has many advantages.

According to the invention a separate control button is not required. Thus the so-called "crossing-over" in double herringbone milking parlors is eliminated. Yet another advantage is that the milker can start the milking process through gripping and holding or lifting the milking unit. This allows the milker to work faster and more continuously.

A start signal is preferably emitted as the weight relief of the flexible element exceeds a predetermined threshold value. It is particularly preferred to have a predetermined threshold value that is independent of the operating conditions of the milking unit cylinder and the milking installation where the milking unit cylinder is operated. The threshold value is in particular independent of the operating vacuum of the milking unit cylinder.

The predetermined threshold value is preferably variable and can be adjusted or changed continuously or in discrete steps.

Preferably at least one biasing element is provided wherein said biasing element may be capable of influencing the predetermined threshold value. Preferably the biasing force of the biasing element counteracts the weight of the flexible element. A start signal is preferably triggered as the weight relief of the flexible element exceeds the biasing force of the biasing element.

In such a configuration in particular the switching point is independent of the operating conditions of the milking installation or the milking unit cylinder since as the resulting weight of the milking unit has sufficiently decreased and the biasing force of the biasing element has been overcome, the start signal is emitted.

Other configurations may allow that a force is not applied through a biasing element but that the force is applied for example as a suction force on a piston where the start signal is emitted as said force is overcome. The drawback to this variant is though that the suction force level depends on the current operating vacuum of the installation since a separate vacuum supply for this application would be disproportionate. This solution therefore provides that the switching point and the emission of the start signal depend on the current operating conditions. An adaptation to different milking unit weights is only possible by varying the effective surfaces. However, the potential to increase the effective surface tends to be limited due to the existing dimensions.

Another drawback in applying a suction force to a piston for generating a biasing force is that the piston operates at the borderline of vacuum and atmosphere, thus requiring high precision guidance to prevent heavy leakage losses. Since at one end of the piston there is the milking range with atmospheric air and at the other end a vacuum, contaminated air can be sucked into the space beneath the piston or into the range of the sensor element. This may cause the sealing surface between the guidance and the piston to be contaminated which may result in increased friction and a jamming of the piston.

If, however, as described above the separate biasing element is used for generating a constant biasing force, all control elements will always be located in air at atmospheric pressure. Since there is no pressure difference, no contaminated air is drawn in and a separate sealing is not required.

Preferably the flexible element is coupled with a piston of the milking unit cylinder.

The sensor element may include a proximity sensor or switch, a magnetic limiting sensor or switch, a dry reed contact sensor or switch, or an expansion measuring strip, a piezoelectric sensor or a weight sensor, or a number of alike or different sensors of the types mentioned and the like wherein said sensor element preferably works contactless.

Preferably at least a portion of the sensor is positioned inside the cylinder.

When the milker takes and holds the milking unit, the rope is relieved of the weight of the milking unit. The sensor element, being capable of detecting such relief, emits the start signal as the threshold value is exceeded.

In a preferred specific embodiment, the biasing element comprises at least one spring element that acts on the flexible element and is for example configured as a rope or a chain. Preferably the biasing element acts on a flexible element arranged in the milking unit cylinder, such as an internal sleeve, a piston or a lever attached to said flexible element. The biasing element causes a prestress. This is primarily intended to equalize the weight and frictional force of the flexible element or rope and the sleeve and other components. If the flexible element (e.g. rope) is relieved of the weight of the milking unit, the biasing element can cause the flexible element to be displaced at or in the milking unit cylinder. The sensor element detects such displacement and the start signal is emitted.

A biasing element including a spring element has many advantages. Utilizing spring elements of different grades of stiffness allows to adjust the triggering force. To this end, the biasing element may be exchangeable. Different spring elements may be used to easily adjust the bias to different milking unit weights. Alternately the effective force of a spring element may be adjusted by applying an adjustable pre-stress to the spring element.

Since spring deflection will as a rule be small, there will be substantially no material fatigue occurring in the spring element. The use of a spring element as the biasing element will require a small total number of components. Other than a spring element, the biasing element may be a weight or an electrical or magnetic force element.

It is possible to use the same device according to the invention for different breeds or species of animals. Since the weights of the milking units for example for cows, camels, sheep and goats differ considerably, adjusting or exchanging the biasing element allows to adjust the device for use with specified milking units. The amount of force of the flexible element (spring, weight, etc.) can be used to adjust the switching sensitivity. With spring elements being used it is therefore preferred to use weak springs for lightweight milking units and more rigid springs for heavy milking units.

If a different kind of biasing element is used where the weight cannot be equalized as readily, such a variable application of the device may not be possible. A biasing element may for example be realized through a control vacuum in a control space. A given surface which the control vacuum acts on will specify the acting force. In lightweight milking units there will thus be a greater risk that start signals are triggered inadvertently.

This holds in particular when the flexible element or the rope leading to the milking unit is repeatedly rerouted. Friction loss at the reversing points will decrease switching reliability. Although this may be equalized by a correspondingly high biasing force of the biasing element, inadvertent triggering may occur in particular in lightweight milking units since the weight of the milking unit and the biasing force will match.

The biasing element may be replaced or supplemented by a sensor such as a weight sensor, or an expansion measuring means such as an expansion measuring strip or the like. When an expansion measuring means is used, a threshold value as the triggering point for a start signal may be set in the control means. This may be regulated manually or by means of computer software. Then the device of the invention will not require any modifications for different environments.

Preferably the start signal is followed at least by opening the milking vacuum. Also, pulsation may start. Monitoring of milk flow may be started in a control means.

In contrast to this, the prior art discloses a position sensor for detecting a traversing of the removal cylinder. Such a device requires considerable displacement of the milking unit for triggering a start signal. Ventilation of the milking unit cylinder only starts after the start signal is emitted. Until then any movement of the milking unit relative to the cylinder is thus inhibited since the milking unit must be pulled out against the vacuum in the cylinder.

The device according to the invention, however, emits the starting signal already as the weight is relieved or the milking unit is lifted briefly, such that the milking unit cylinder is ventilated quickly and pulling out is possible.

The milking unit cylinder, which may be configured as an supporting and draw-off cylinder, is preferably positioned horizontally and preferably rigidly mounted. Thus the working range is extended. A vertical cylinder may also be used which will as a rule also be rigidly mounted. The starting method proposed herein is independent from the cylinder position and works both with horizontally and vertically positioned cylinders.

In up-to-date installations, a plurality of data can be input and output into and from the display and control unit. According to the operating philosophy the display and control unit for the current cow should therefore always be positioned in the visual range of the milker.

In particular near the end of the milking process the milker should be able to see the udder since a good, experienced milker can recognize from the state of the udder whether or not it is milked out. The milker will also palpate the udder quarters, or milk manually to determine whether or not any substantial amount of milk may be left in the udder. The display and control unit or the graphic control unit should, however, also be within the vision field of the milker since many data are output such as the currently milked amount versus the expected amount, the guide value display and other data. With both the udder and the display and control unit in the range of vision the configuration and the structure of the milking stall is therefore in particular advantageous.

It is a significant advantage of an automatic start according to the invention that e.g. in installations having a mirrored configuration no "crossing-over" of hands will occur. In a double herringbone milking parlor for example half of the milking stalls are arranged in a mirror-image versus the other half. This results in that on one side, the milker will come to the next animal in the row for example to his right while on the other side of the milking parlor it will be to the left as the milker sees it. Now, if conventional starter buttons were always placed on the right, half of the milking stalls in such a herringbone milking parlor would inhibit a simultaneous visual check of the graphic display and the udder. Then again, if starter buttons were placed on the other (left) side, the starting process would be more difficult for the milker as for example he would hold the milking unit in his left hand while he must cross his right hand over the left for pressing the starter button. Therein the milker must cross his right hand over the left for starting the milking process.

An automatic start overcomes these disadvantages since a starter button is no longer required. The display can always be placed in the vicinity of the udder such that the milker will register with one look both the udder and the display or operating means, wherein placement to the right or left of the milking stall is immaterial.

The milking unit cylinder comprises at least a rapid ventilation that can be controlled or is controllable through a membrane. Said membrane can be brought into at least one open position and at least one closed position. Preferably said rapid ventilation comprises at least one ventilation aperture dimensioned and arranged so as to allow a rapid ventilation of the milking unit cylinder. The ventilation effect of the rapid ventilation is preferably considerable and particularly preferred it is by at least 50% faster than in conventional ventilation systems.

Such a milking unit cylinder has many advantages. It allows fast displacement of the milking unit toward the udder of the animal to be milked without requiring large operating forces from the milker. The considerable air intake due to the rapid ventilation allows the milking unit to be displaced rapidly and without requiring large forces; the piston of the milking unit cylinder can be pulled out of the cylinder with greater ease. The prior art in contrast requires large operating forces for rapidly displacing the milking unit since the friction resistance of inflowing air must be overcome. The rapid ventilation according to the invention largely eliminates these disadvantages.

In a preferred specific embodiment, air at superpressure is fed to the rapid ventilation. A suitable coordination of the components can achieve that the milking unit is displaced generally without force such that the milker only guides the milking unit.

Preferably the rapid ventilation comprises at least one additional ventilation having at least one aperture. Thus the ventilation achieved is considerably faster than with conventional ventilation only.

It is a significant advantage of the present invention as regards the automatic start function and also the rapid ventilation function that existing installations can readily be retrofitted. Existing installations can be retrofitted through replacing a few components wherein the cylinder sleeve of the milking unit cylinder can generally remain while the piston, the sensor element and the like are replaced. Retrofitting is possible due to the small structural volume.

In all configurations of the milking unit cylinder with rapid ventilation, said rapid ventilation is preferably controlled by means of a rapid ventilation or pilot valve at the cylinder. A rapid ventilation valve allows to control the valve through relatively small control air cross-sections wherein a large air cross-section is opened for ventilation. The valve is preferably positively actuated which allows reliable switching and makes the switching point independent of the current pressure ratios.

It is preferably provided to control the membrane or the rapid ventilation through a control port with separate control air. The control port preferably leads into a control volume that is completely closed versus the interior of the milking cylinder such that there is no flow connection between them and no air will be exchanged between the air for operating the milking unit cylinder and the control air for the rapid ventilation. It is advantageous to use the control air for the rapid ventilation not for aeration or ventilation but only for valve control: this will allow reliable switching. Otherwise certain intermediate valve positions might cause exchanges between inlet air and outlet air. For example when the evacuation port is already slightly opened while the inlet port is still slightly open, both could be short-circuited so as to result in an indeterminate intermediate position where no autonomous opening or closing will occur. To avoid such intermediate positions, a fast vacuum build-up or air inlet is therefore required which is, however, not always desired in particular for vacuum build-up.

In the interior of the rapid ventilation valve the membrane is in particular applied. It is also conceivable to use a rapid ventilation valve with piston control instead of membrane control. To this purpose the piston is guided in an intake. When the piston is in a first (end) position, the rapid ventilation is for example operative and in a second (end) position the rapid ventilation is locked. The piston may be configured to be brought into the first position by control air at atmospheric pressure and to be brought into the second position by a vacuum on the control side. The dimensions of the piston and intake are preferably chosen such that leakage loss will be low and friction loss in piston movement will be low wherein the surfaces are configured such that the forces acting on the piston are sufficient for the respective application.

It is a disadvantage of a rapid ventilation valve with piston control that due to contamination, friction of the piston in the intake can rise considerably until control is no longer possible. It is another disadvantage that the switching point depends on the current pressure conditions. One advantage of a membrane is that no air whatever is exchanged and the function of a membrane is considerably less susceptible to contamination.

A biasing means is preferably provided for biasing the membrane in the direction of a closed position. Said membrane can preferably be displaced against the force of the biasing means into at least one ventilation position. In the ventilation position, air can be let in through the rapid ventilation aperture.

According to a preferred specific embodiment the interior of the milking unit cylinder with the piston placed inside is provided on one side of the membrane. A second, annular interior space that is in fluid connection with the external air through the rapid ventilation apertures, preferably extends on the same side. Preferably said second, annular interior space extends radially at least partially around the interior space of the cylinder. It is also preferred that the interior space of the rapid ventilation valve is placed on the other side of the membrane which space is connected with the membrane control port.

The membrane control port can preferably be loaded with air. For effecting control, air at sub-pressure or air at standard or superpressure can be used. The rapid ventilation is preferably opened by delivering air at sub-pressure, or some vacuum, to the membrane control port.

It is particularly preferred to place the membrane in the ventilation position by the atmospheric pressure in the second annular interior space and by applying subpressure to the membrane control port.

These specific embodiments serve to achieve better switching reliability. An "accidental" opening and closing of the rapid ventilation is reliably prohibited since the force of the biasing means must be overcome for actuating the rapid ventilation.

Although it is generally possible to achieve a more rapid ventilation than in the prior art by means of larger cross-sections of the inlet ducts, the larger diameter hoses required therefor will result in considerably increased air consumption, requiring a larger vacuum capacity since the air present in the duct system must be re-evacuated at removal. Another disadvantage of larger hose diameters is that the hose stiffness increases, making assembly more difficult. Larger duct cross-sections also require larger and thus more expensive valves to keep pressure loss within limits. The power consumption of such switching valves is also large which in turn requires an electronic power system. All of this is not required in a rapid ventilation according to the invention. The manufacturing costs and power demands are significantly lower.

If a valve is used for ventilation, there is the risk of valve contamination and thus of malfunction. In the rapid ventilation according to the invention, ventilation is not effected through a valve but through ventilation apertures positioned at the outer cylinder wall, preferably with a filter placed ahead.

It is another disadvantage of large duct cross-sections that the air is drawn off too fast as the milking unit is removed. The removing process of the milking unit should preferably be slow and careful.

Preferred specific embodiments may provide that the additional ventilation or the additional ventilation apertures may be actuated separately or in ventilation it may be provided that the additional apertures do not let in any air by not actuating the rapid ventilation valve. Then air can enter the milking unit cylinder only through the conventional air duct so that the milking unit can be slowly lowered for specific applications such as cleansing or rinsing.

The concurrent application of the automatic start function of the invention with the rapid ventilation of the invention is in particular preferred. Without rapid ventilation, the milker must pull the piston out over its entire length while a conventional start through a starter button will partially pull out the piston through the weight of the hanging milking unit. With a concurrent application of the automatic start function and rapid ventilation, the milking unit is already in the milker's hand so that the piston automatically slides out of the cylinder, saving time and force. Thus the start of the milking action is in particular facilitated.

Further embodiments and advantages of the present invention are shown in an embodiment which will now be described with reference to the drawing.

DETAILED DESCRIPTION OF THE PREFERRED EMBODIMENTS

Figure 1:
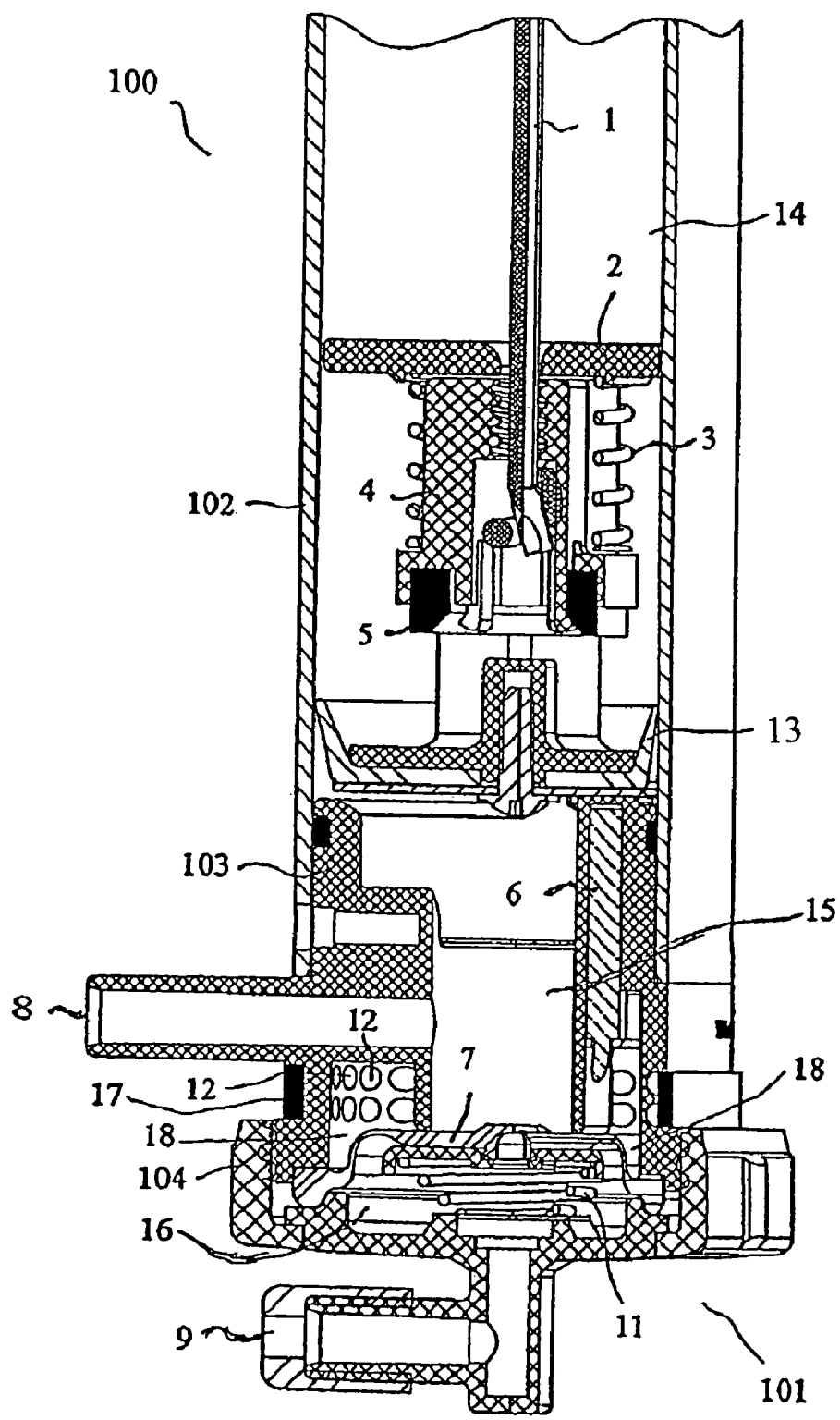
FIG. 1 the stand-by state for milking, and
FIG. 2 the state after sensor activation with the rapid ventilation open.
Figure 2:
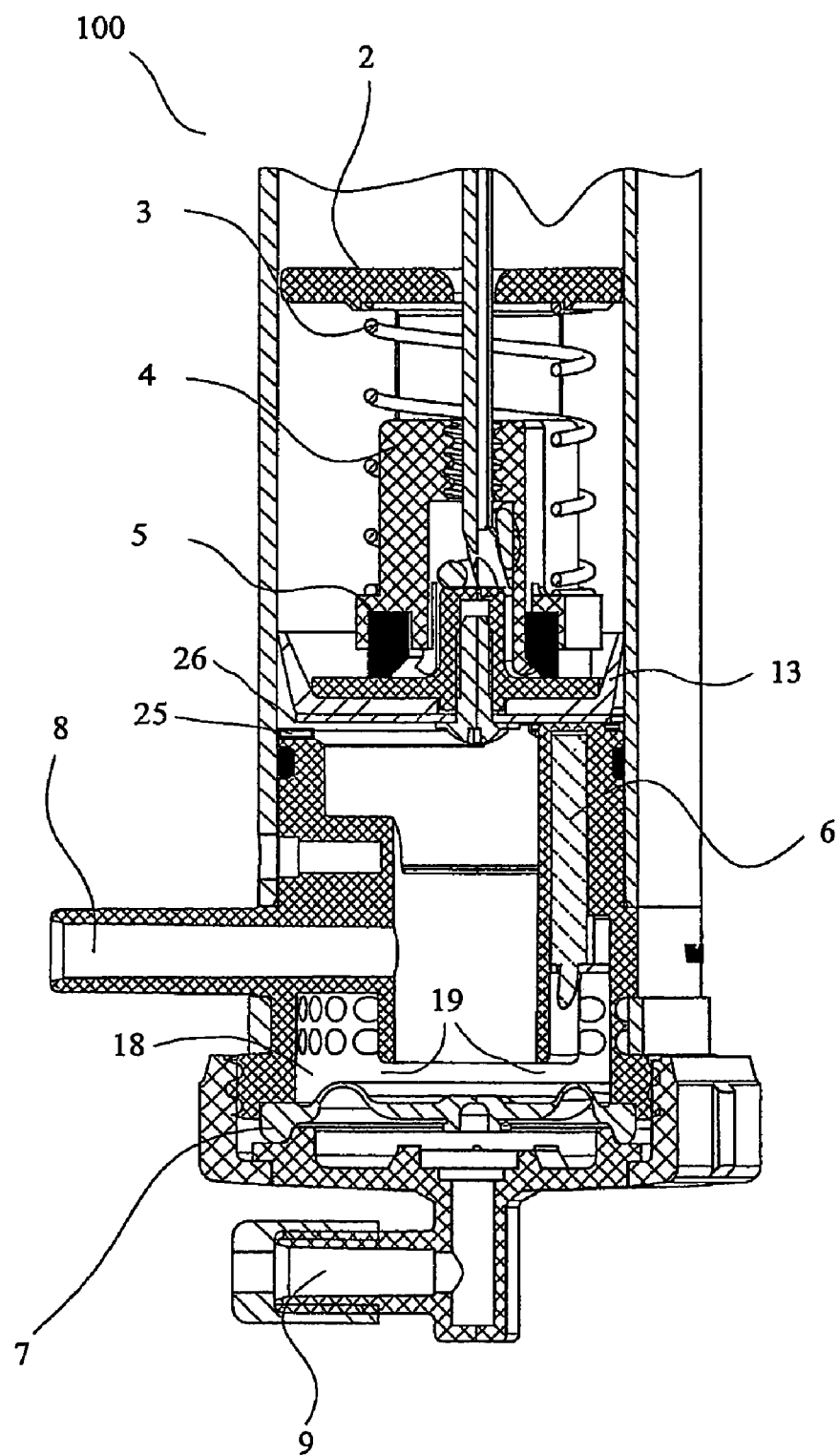

FIGS. 1 and 2 illustrate a milking unit cylinder 100 in cross-section which in the embodiment is configured to be a removal cylinder 100 or ACR cylinder (automatic cluster remover), comprising a cylinder sleeve 102, a piston 2 guided in said cylinder sleeve, a lid element 103 and a rapid ventilation valve 104.

FIG. 1 illustrates the basic state where the milking unit cylinder 100 is in the stand-by state for milking, while FIG. 2 illustrates the state after sensor activation with the rapid ventilation open.

In the removal cylinder 100 the piston 2 has a flexible element 1 fastened to it. The flexible element 1 in the embodiment is a rope 1. The rope 1 is guided out of the cylinder 100 to the milking unit (not shown) that is freely movable, hanging from the rope 1. The rope may be routed over one or more deflection pulleys so as to make the milking unit cylinder 100 suitable for different vertical and horizontal mounting positions.

A cup seal 13 at the piston 2 reliably seals the cylinder interior 15 against the exterior 14. Depending on the operating state, the cylinder interior 15 is kept at e.g. atmospheric pressure or under a vacuum.

FIG. 2 shows the state where the milking unit has been lifted whereby the rope 1 is relieved. Owing to the force of the spring 3, the internal sleeve 4 is displaced toward the end 101 or in the direction of the lid element 103 of the cylinder 100. The internal sleeve 4 is fixedly coupled to the rope 1. This causes the magnet 5 to be displaced towards the sensor element 6 which in the embodiment is configured as a proximity switch such as a reed magnetic switch or a magnetic limit switch 6 such that the magnet 5 is displaced into the switching range of the magnetic limit switch 6 that is positioned in the removal cylinder 100 at the end 101. The magnet 5 in turn is fastened to the internal sleeve 4 that holds one end of the rope 1. The proximity of the magnet 5 to the magnetic limit switch 6 results in triggering. The start signal for the milking process is emitted. The magnet 5 is positioned in the exterior 14 at normal pressure, while the magnetic limit switch 6 is positioned in the cylinder interior 15.

The sensor element 6 is positioned to be spatially fixed. The only movement is that of the magnet 5, not the magnetic limit switch 6 so as to avoid an extensive cable routing to a moving sensor.

Instead of the magnetic limit switch, a Hall sensor or the like could be used. The use of a weight sensor is likewise possible such as an expansion measuring strip or a piezoelectric sensor for detecting the weight on the rope 1 or the sleeve 4, or the pressure on the lid element 104 or other elements. The sensor may be provided to be a load cell between the piston and the lid element or the cylinder lid bottom, or between the piston and the rope or the like.

When the milking unit is lifted or even only held, a corresponding sensor 6 can emit a signal to the control unit (not shown). This will apply atmospheric pressure (particular embodiments may provide for superpressure) to the vacuum port 8. A specified vacuum may simultaneously be applied to the membrane control port 9 or the vacuum port 9.

It is possible to provide a sensor 6 that responds to a weight relief of the milking unit or a weight relief of the rope without having to displace the milking unit or the rope. This may be carried out by load sensors. It is also conceivable for example that minor movements of the rope or the milking unit are detected which causes the start signal to be triggered.

Different force ratios due to different milking unit weights can be equalized through exchanging the springs or by applying software in the control unit if for example expansion measuring strips, load cells, piezoelectric elements or the like are used.

After the start signal is emitted, (atmospheric) air flows through the vacuum port 8 into the cylinder interior between the piston and the lid. This releases the piston with the rope so that the milking unit can be displaced toward the animal. Owing to reductions in cross-section and the like, pressure loss will occur in the milking unit cylinder. At a given pulling force the speed with which the milking unit can be pulled or displaced toward the animal is thus limited. To achieve faster displacement of the milking unit, the force applied must be increased which is exhausting on a permanent basis.

According to another proposal of the present invention for facilitating the starting process there is thus provided in this embodiment, at the lower end 101 of the cylinder, a rapid or additional ventilation through a rapid ventilation valve 104 that is activated with or after the start signal.

Before the start signal is emitted, the membrane 7 of the rapid ventilation valve 104 is biased through the biasing spring 11 such that the gap 19 is closed through the membrane 7 as is illustrated in FIG. 1. Air is fed to the gap 19 through ventilation apertures 12 provided behind a filter element 10. The biasing spring may be substituted by a biasing weight. The bias of the membrane may be utilized for biasing purposes such that the membrane 7 simultaneously serves as a biasing means.

As the milking process is started, the milking vacuum is as a rule released to the milking unit by means of a valve. The control air or the control vacuum for controlling said valve is preferably applied to the vacuum port 9 or the membrane control port 9. This will eliminate the need for an additional control valve. The interior 16 of the control valve will thus be at subpressure. This is why the vacuum for the membrane control port 9 is available in the milking installation after the start signal. The reason is that as the start signal is emitted, a vacuum is also applied to the milking unit. The control signal for releasing the vacuum of the milking unit can at minimum energy be directed to the vacuum control port 9 of the milking unit cylinder. There is therefore no need for an additional switchable valve for implementation. As the milking process is started (automatically), the vacuum for the milking unit is activated and a vacuum is applied to the membrane control port 9. This results in a particularly simple structure.

Air at normal pressure (atmospheric air) is simultaneously applied to the vacuum port 8. This will cause air at atmospheric pressure to be fed through the vacuum port 8 into the cylinder interior 15.

Due to the pressure difference between the ring space 18 (atmospheric pressure) on one side of the membrane 7 and the subpressure present in the control valve interior 16 on the other side of the membrane, the force of the biasing means or the biasing spring 11 is overcome. The membrane 11 is displaced in the direction of the end 101 of the removal cylinder against the force of the biasing spring 11, releasing the gap 19 such that the air can flow from the exterior through the filter 17 and through the rapid ventilation apertures 12 into the cylinder interior 15. This is the state illustrated in FIG. 2.

The present embodiment has the ventilation apertures 12 of the rapid ventilation arranged radially. The atmospheric air will flow in considerably faster than if air would only flow in through the vacuum port 8. The reason is, apart from the large cross-section surface of all of the ventilation apertures 12, that the rapid ventilation will subject the air flowing in only to minor flow losses e.g. due to air deflections and narrowing cross-sections.

This will cause the flow resistance of the hoses, valves, etc. toward the vacuum port 8 to be no longer relevant since the ventilation apertures 12 of the rapid ventilation 12 allow a sufficient air intake.

This considerable amount of atmospheric air flowing in through the ventilation apertures 12 considerably increases the possible displacement speed of the rope 1 and thus of the milking unit. Simultaneously the force required to pull the rope out of the cylinder while displacing the milking unit toward the animal is noticeably smaller. The piston 2 will glide easily being pulled out of the milking unit cylinder.

The device according to the invention also allows to implement a special starting function. This can be achieved e.g. by the milker holding the milking unit for a predetermined amount of time without moving it much. Then a special program can be started. For example when the unit is held for a short time, stimulation is started and when it is held for a longer time, the normal milking process is started. The time interval can be e.g. 0.25 seconds or 0.5 seconds or 1 second or 2 seconds. It is also possible to implement a third special starting function that starts specific special functions e.g. after an extended time or by means of lifting the milking unit a number of times. One possible special function is e.g. that a stop signal is emitted after a prolonged time of holding so as not to have the installation run unnecessarily e.g. when the milking unit is hung up and thus does not exert weight.

Another embodiment such as it is suggested in FIG. 2 may provide, instead or in addition to the magnetic limiting switch 6, a sensor e.g. configured as a pressure sensor 25 which may include e.g. an expansion measuring strip, a load cell, or a piezoelectric element. This embodiment does not require a spring element 3 nor an interior sleeve 4 but the flexible element or rope 1 can be fastened directly to the piston 2. The only parts moving for the starting function need to be the piston 2 with the rope 1 since the sensor 25 detects the force with which the piston 2 presses against the surface 26 of the lid element 103. When the operator takes and holds the milking unit, the contact force of the piston 2 increases since the weight of the milking unit has stopped decreasing the vacuum force. The start signal is emitted as the signal falls below or exceeds a specific threshold. This embodiment allows a self-adjustment to different milking unit weights since the pressure or the force is detected continuously. A determining of differences in values in the stand-by state for milking and with the milking units lifted allows to automatically adjust the switching threshold.

The invention claimed is:

1. A milking unit cylinder comprising:
    a flexible element;
    a sensor element which detects a substantial weight release from the flexible element to trigger a start signal for a milking process; and
    a rapid ventilation valve in communication with the sensor element, wherein the rapid ventilation valve moves between a closed position when in a stand-by mode and an open position when a start signal is triggered.

2. The milking unit cylinder according to claim 1, wherein the sensor element emits a start signal as the weight release from the flexible element exceeds a predetermined threshold value.

3. The milking unit cylinder according to claim 2, wherein the predetermined threshold value is variable.

4. The milking unit cylinder according to claim 1, wherein the sensor element which detects a substantial weight release from the flexible element, triggers a start for a milking process at a predetermined threshold weight release value that is independent of a dairy milking unit operating vacuum.

5. The milking unit cylinder according to claim 1, and further comprising:
    a biasing element disposed to move the rapid ventilation valve into a closed position.

6. The milking unit cylinder according to claim 5, wherein the predetermined threshold value is relative to a force applied by the biasing element.

7. The milking unit cylinder according to claim 1, wherein the flexible element is coupled to a movable element.

8. The milking unit cylinder according to claim 1, wherein the flexible element is configured as a chain.

9. The milking unit cylinder according to claim 1, wherein the flexible element is coupled to a milking unit.

10. The milking unit cylinder according to claim 1, wherein at least one sensor element is selected from a group of sensors consisting of: load measuring means, proximity switches, magnetic limiting switches, dry reed contact switches, expansion measuring strips, magnetic, inductive, capacitive sensors and resistance sensors and combinations thereof.

11. The milking unit cylinder according to claim 1, wherein at least a portion of the sensor element is mounted within the cylinder.

12. The milking unit cylinder according to claim 1, wherein the sensor element is spaced apart from the flexible element.

13. A milking unit cylinder according to claim 1, wherein the rapid ventilation valve comprises a closing element which is movable between an open position and a closed position.

14. The milking unit cylinder according to claim 1, wherein the rapid ventilation valve defines a control port.

15. The milking unit cylinder according to claim 14, wherein the rapid ventilation valve comprises:
    a membrane for moving between a control port open position and a control port closed position; and
    a biasing element that biases the membrane toward the control port closed position.

16. The milking unit cylinder according to claim 15, wherein the membrane in the control port open position permits air to flow into the milking unit cylinder.

17. The milking unit cylinder according to claim 15, wherein the membrane is disposed in the milking unit cylinder to define an interior space; and the milking unit cylinder further comprises a piston mounted in the interior space.

18. The milking unit cylinder according to claim 17, wherein the control port is mounted on the side of the membrane that is opposite the piston.

19. The milking unit cylinder according to claim 18, wherein the membrane can be placed in a ventilation position by applying atmospheric pressure in the interior space and by applying subpressure to the membrane control port.

20. A milking machine cylinder comprising:
- a flexible element;
- a sensor element which detects a substantial weight release from the flexible element to trigger a start signal for a milking process;
- a rapid ventilation valve in communication with the sensor element, wherein the rapid ventilation valve defines a control port, and wherein the rapid ventilation valve comprises:
  - a membrane for moving between a control port open position and a control port closed position; and
  - a biasing element that biases the membrane toward the control port closed position.

21. The milking machine cylinder of claim 20, wherein the biasing element is a spring.

22. The milking machine cylinder of claim 20, wherein the biasing element is a weight.

23. The milking unit cylinder according to claim 20, and further comprising:
- a biasing element disposed to move the rapid ventilation valve into a closed position.

24. The milking unit cylinder according to claim 20, wherein the membrane is disposed in the milking unit cylinder to define an interior space; and the milking unit cylinder further comprises a piston mounted in the interior space.

25. The milking unit cylinder according to claim 20, wherein the membrane can be placed in a ventilation position by applying atmospheric pressure in the interior space and by applying subpressure to the membrane control port.

26. The milking machine cylinder of claim 20, wherein the sensor element is a magnetic limit switch.

27. The milking machine cylinder of claim 20, wherein the sensor element is a proximity switch.

28. The milking machine cylinder of claim 20, wherein the sensor element is a reed magnetic switch.

29. The milking machine cylinder of claim 20, wherein the sensor element is a magnetic limit switch.

30. The milking machine cylinder of claim 20, wherein the sensor element is a magnetic limit switch with a displaceable magnet.

* * * * *